United States Patent
Wu

(10) Patent No.: US 8,310,203 B2
(45) Date of Patent: Nov. 13, 2012

(54) BATTERY BALANCING METHOD

(75) Inventor: Chih-Yen Wu, Taipei County (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 441 days.

(21) Appl. No.: 12/731,399

(22) Filed: Mar. 25, 2010

(65) Prior Publication Data

US 2011/0156649 A1 Jun. 30, 2011

(30) Foreign Application Priority Data

Dec. 28, 2009 (CN) .......................... 2009 1 0260299

(51) Int. Cl.
*H02J 7/00* (2006.01)
(52) U.S. Cl. ...................................................... 320/118
(58) Field of Classification Search ........... 320/116–123
See application file for complete search history.

(56) References Cited

U.S. PATENT DOCUMENTS

2010/0079116 A1* 4/2010 Thivierge et al. ............. 320/153

* cited by examiner

*Primary Examiner* — Melissa Koval
*Assistant Examiner* — Daniel Miller
(74) *Attorney, Agent, or Firm* — Rosenberg, Klein & Lee

(57) ABSTRACT

A battery balancing method for a battery pack is disclosed, wherein the battery pack includes a plurality of rechargeable battery cells. The method categorizes the plurality of battery cells into a first subgroup and a second subgroup. Each battery cell in the first subgroup has an over voltage count number that records the times of the battery cells reaching an over voltage protection point. A minimum voltage of the battery cells in the second subgroup is detected. Then the voltage of each battery cell in the first subgroup is decreased to a buck voltage lower than the minimum voltage of the second subgroup. While any one cell in the first group reaches the over voltage protection point again during the charging procedure, the over voltage count numbers for the particular battery cells already reached the over voltage protection point are accumulated and then the charging procedure is terminated.

20 Claims, 4 Drawing Sheets

BATTERY BALANCING METHOD

BACKGROUND OF THE INVENTION

1. Field of the Invention

The present invention relates to a battery pack voltage equalization method, and more particularly, to a passive balancing method for battery packs.

2. Description of Related Art

Rechargeable batteries have now been widely used to provide electrical power to a variety of electronic products. The terminal voltage or capacity of a signal battery (cell) is limited. A battery pack which is composed by a plurality of rechargeable battery cells connected in series is used in electronics such as laptops to increase the output voltage and charge capacity. The charging/discharging capacity, charging conversion efficiency, or initial capacity of each battery cell within the same battery pack could be inconsistent to each other. Therefore, after repeated charging and discharging processes in a long term, the discrepancies among each battery cell may be amplified, so that the performance of the battery pack becomes more and more limited by battery cells with poor characteristics.

In order to increase the lifetime of the battery pack and reduce the above-mentioned problem, a battery equalization mechanism is provided in many battery management systems, such as a passive balancing method, which takes the lowest voltage among all of the battery cells of the battery pack as a reference voltage and consuming the electricity of batteries with voltage higher than the reference voltage by resistor into heat for dissipating, so that each battery cell of the battery pack may initiate to charge from the same voltage, so as to solve the issues of that battery cells with poor characteristics may not be fully charged.

However, the conventional passive battery balancing method does not consider the discrepancies of maximum discharging/charging capacities among each of the battery cells, yet take the same reference voltage to determine the balancing criteria for different battery cells. The conventional method often causes the battery cells with better performance in the battery pack to be limited by the battery cells with poor performance during the equalization process. Moreover, such method doesn't take the battery aging factor into consideration.

SUMMARY OF THE INVENTION

In view of the aforementioned issues, the present invention provides a battery balancing method which categorizes each battery cell in a battery pack according to different characteristics and then performs battery balancing with respect to each category, thereby equalizing the charging and discharging process more efficiently, improving the electricity storage capability of the battery pack, and extending the lifetime of the battery pack.

To achieve the aforementioned objectives, the present invention provides a battery balancing method for a battery pack, wherein the battery pack is composed by a plurality of rechargeable battery cells, the steps of the method includes: categorizing the plurality of battery cells into a first subgroup and a second subgroup, wherein, an over voltage count number of each battery cell already reached an over voltage protection point belonged to the first subgroup is larger than zero, and the over voltage count number of each battery cell belonged to the second subgroup equals to zero. As the battery pack is in charging, the battery cells of the second subgroup perform voltage equalization in response to a minimum voltage detected from the battery cells of the second subgroup firstly. And the voltages of the battery cells of the first subgroup decrease to be lower than the minimum voltage in response to the over voltage count number and a voltage constant respectively so as to perform voltage equalization. While the either one of battery cells in the battery pack have reached the over voltage protection point in a charging mode, the over voltage count number in accordance with the battery cells already reached the over voltage protection point is accumulated and the charging procedure of the battery pack is discontinued; conversely, while all of the battery cells in the battery pack have not yet reached the over voltage protection point, it continues to charge the battery cells till all of the battery cells are fully charged. Then, it discontinues charging the battery pack.

To achieve the aforementioned objectives, the present invention further provides another battery balancing method for a battery pack, wherein the battery pack includes a plurality of rechargeable battery cells. The method initiates to charge the battery pack and categorizes the plurality of battery cells into a first subgroup and a second subgroup. Each battery cell in the first subgroup has an over voltage count number that records the times of the battery cells reaching an over voltage protection point. A minimum voltage of the battery cells in the second subgroup is detected. Then the voltage of each battery cell in the first subgroup is decreased to a buck voltage lower than the minimum voltage of the second subgroup. While any cell in the first group reaches the over voltage protection point again during the charging procedure, the over voltage count numbers for the particular battery cells already reached the over voltage protection point are accumulated and then the charging procedure is terminated.

In order to further understand the techniques, means and effects the present invention, the following detailed description and included drawings are hereby referred, such that, through which, the purposes, features and aspects of the present invention may be thoroughly and concretely appreciated; however, the included drawings are provided solely for reference and illustration, without any intention to be used for limiting the present invention.

DETAILED DESCRIPTION OF THE PREFERRED EMBODIMENTS

The present invention primarily provides a battery balancing method suitable for use for a discharging and charging controller coupled to a battery pack, wherein the controller includes a monitoring circuit for monitoring each battery cell state in the battery pack and a micro-controller for controlling discharging, charging, and equalization of each battery cell. A variety of preferred embodiment illustrated as following are implemented by the controller.

Figure 1:
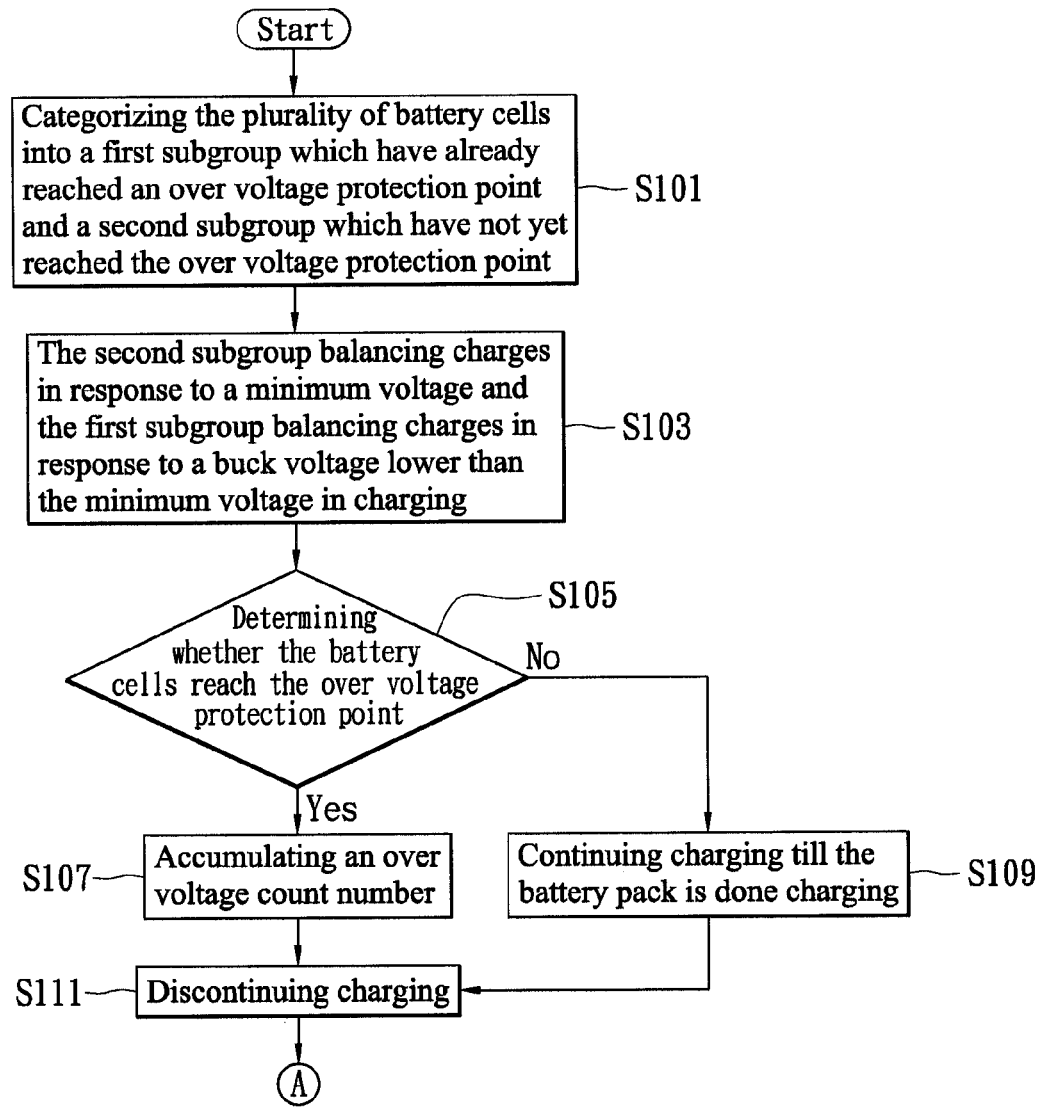
FIG. 1 illustrates a charging flowchart of a first embodiment of the battery balancing method in accordance with certain aspects of the present invention.
Figure 2:
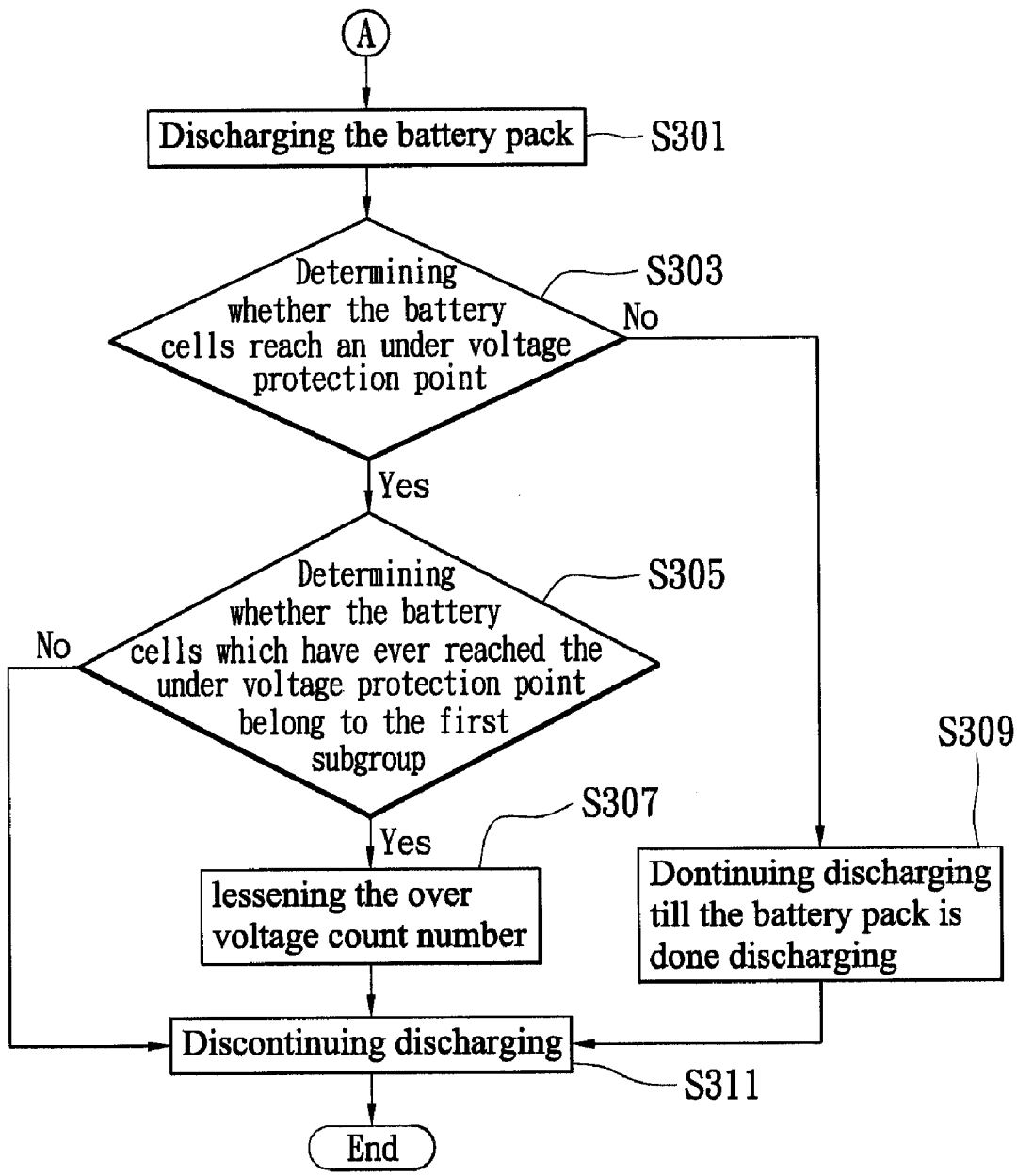
FIG. 2 illustrates a discharging flowchart of the first embodiment of the battery balancing method in accordance with certain aspects of the present invention.

First, referring to FIG. 1 and FIG. 2, in which a flowchart of a first embodiment of the battery balancing method for a battery pack according to the present invention is demonstrated. Because the battery pack performs voltage equalization by repeating discharge and charge procedures, FIG. 1 is used to illustrate charging procedures in accordance with the first embodiment and FIG. 2 is used to illustrate discharging procedures.

As shown in FIG. 1, each battery cell in the battery pack is categorized into a first subgroup and a second subgroup in step S101 in response to charging speeds; a specific threshold for classification is determined with respect to an over voltage count number of each battery cell. The over voltage count number represents how many times has the battery cell ever reached an over voltage protection point (OVP point) in charging. A portion of battery cells in the battery pack are charged faster than other battery cells. Whereas the portion of battery cells with higher charging speed are done charging, the other battery cells are not yet charged to a predetermined operating voltage. Thus, the battery pack maintains in a charging mode, so that the portion of battery cells which are done charging increase its' voltages until the voltages reach to the over voltage protection point which is set to protect battery components. In the embodiment, the over voltage count numbers in accordance with the battery cells which are categorized into the first subgroup exceed zero and the over voltage count number of the battery cells of the second subgroup equal to zero. The over voltage protection point is a maximum threshold voltage associated with the battery cells in charging. As any one of the battery cells in the battery pack reaches the over voltage protection point, it represents that the voltage of the specific battery cell exceeds other battery cells and has reached the maximum threshold voltage. Therefore even though other battery cells of the battery pack are not yet fully charged, the battery pack must discontinue to charge, thereby preventing from damaging the specific battery cell already reached the over voltage protection point. Consequently, the implementation of the aforementioned protection mechanism wastes the left over charge storage capacity of the other battery cells which are not yet fully charged accordingly.

The battery cells of the two subgroups after categorization initiate to charge based on different voltages, wherein the second subgroup takes a minimum voltage as a benchmark voltage among the plurality of battery cells, such that each battery cell of the second subgroup in charging operations performs passive voltage equalization with respect to the minimum voltage so as to charge equally.

Yet the battery cells in the first subgroup have records related to that the battery cells have reached the over voltage point earlier than other battery cells in the prior charging operations. In other words, the voltages of the battery cells in the first subgroup increase faster than other battery cells which have not yet reached the over voltage protection point during the same charging period. Therefore, in the embodiment, adjusting charging standard points of the battery cells by reducing the benchmark voltages of the battery cells of the first subgroup to perform charging is applied herein.

The aforementioned method is applicable to adjust the voltage of each battery cell in the first subgroup to a buck voltage lower than the minimum voltage of the second subgroup by adjusting down a product of a voltage constant associated with the charging benchmark voltage of the battery cells in the first subgroup multiplying the recorded over voltage count number of each battery cell of the first subgroup.

Then during charging, the adjusted buck voltage of each battery cell in accordance with the first subgroup is taken as the benchmark voltage to perform passive voltage equalization in step S103. Thus, because the over voltage count numbers of the battery cells in the first subgroup are applied as multiples for lowering the voltages thereof, it is easy to conclude that the larger the over voltage count number of each battery cell is, the larger the reduction magnitude of each battery cell in voltage is, and the lower the buck voltage is, in the prior charging operations.

After the step S103 of setting the charging benchmark voltages in accordance with the battery cells of the first subgroup and the second subgroup respectively, it is necessary to further determine whether any of battery cells have reached the over voltage protection point before the other battery cells reached to the operating voltage in step S105 during charging operation of the battery pack. The above-mentioned battery cells already reached the over voltage protection point may be any one of that in the first subgroup or the second subgroup. When the situation occurs for any one of battery cells to reach the over voltage protection point in charging, the over voltage count number of the specific battery cell reached the over voltage protection point is accumulated by 1 in step S107 and the battery pack discontinue to charge in step S111, thereby preventing from damaging the specific battery cell reached the over voltage protection point.

On the other hand, if there is no battery cell has ever reached the over voltage protection point before the other battery cells not yet reached the operation voltage with respect to the determination result in step S105, it represents that each battery cell in the battery pack in the effects of the passive charge balancing, receives the electrical power equally to increase its voltage. Under the situation, each battery cell performs charging until all of the battery cells in the battery pack are done charging in step S109. It also means that the battery pack may stop the charging operations after the battery cells of that all reach the predetermined operation voltage in step S111, thereby completing charging procedures of the battery pack steadily and charging each battery cell equally.

The discharging procedures as shown in FIG. 2 perform after the charging procedures shown in FIG. 1. After the battery pack is done charging, the battery pack is usually be applied to an electronic device to perform discharging in step S301, i.e. supplying electrical power. During the discharging operations of the battery pack, it is necessary to determine whether any of battery cells of the battery pack have reached an under voltage protection point earlier than other battery cells which are not discharged completely in step S303. The under voltage protection point is a minimum threshold voltage associated with the battery cells in discharging. As any one of the battery cells in the battery pack discharges so that the voltage of that reduces to the under voltage protection point, discharging operations must be terminated so as to prevent from damaging the battery cell.

If there are battery cells reached the under voltage protection point during discharging, it must determine whether the battery cells belong to the first subgroup in step S305. In other words, the specific battery cells reduced the charging benchmark voltages thereof because the specific battery cells have reached the over voltage protection point during the charging operations. If the battery cells reached the under voltage protection point are belonged to the first subgroup, it may represents that the charging benchmark voltages were reduced too low during the charging operations, such that the battery cells with faster discharging speeds reach to the under voltage protection point before the other battery cells during the discharging operations. Under the situation, the over voltage count numbers of the battery cells already reached the under voltage protection point is lessened in step S307, so that the reduction magnitudes of the battery cell in voltage are reduced for next charging operations and then discontinue to discharge in step S309; conversely, if the battery cells which reached to the under voltage protection point are belonged to the second subgroup, it represents that the voltage of the battery cells in the battery pack approach a minimum limit under normal discharging operations, and then terminate the discharging operations immediately.

After the step S303, if the determination result shows there is no battery cell reached the under voltage protection point during the discharging operations and it represents that each batter cell of the battery pack is discharging in a normal speed, the battery pack continue discharging until all of the battery cells in the battery pack are done discharging in step S309, thereby terminating the discharging operations in step S311.

As per the aforementioned descriptions, if the battery cells belong to the first subgroup in discharging, reach the under voltage protection point earlier than the other battery cells, it represent that the buck voltages of the battery cells were adjusted too low during the previous charging operations. Therefore, during the discharging operations, while the battery cells reached the under voltage protection point are determined to belong to the first subgroup, it must not only lessen the over voltage count numbers thereof, but also further tag the battery cells reached the under voltage protection point, so as to reduce the reduction magnitudes of the back voltages associated with the battery cells for next charging operations.

In addition, as the battery cells of the first subgroup during the charging operation are determined to reach the over voltage protection point again (step S105 in FIG. 1) and the battery cells have the tags of reaching the under voltage protection point in the previous discharging operations, it represents the battery cells are aged and the service life of the battery cells may be exhausted due to charging and discharging too many times. The voltages of the aging battery cells may not only decrease fast in discharging but also increase fast in charging. Under the above-mentioned situation, the step of accumulating is not executed, yet the step of discontinuing discharging is performed directly for preventing to take away the possibility for the aging battery cells to be charged completely.

Figure 3:
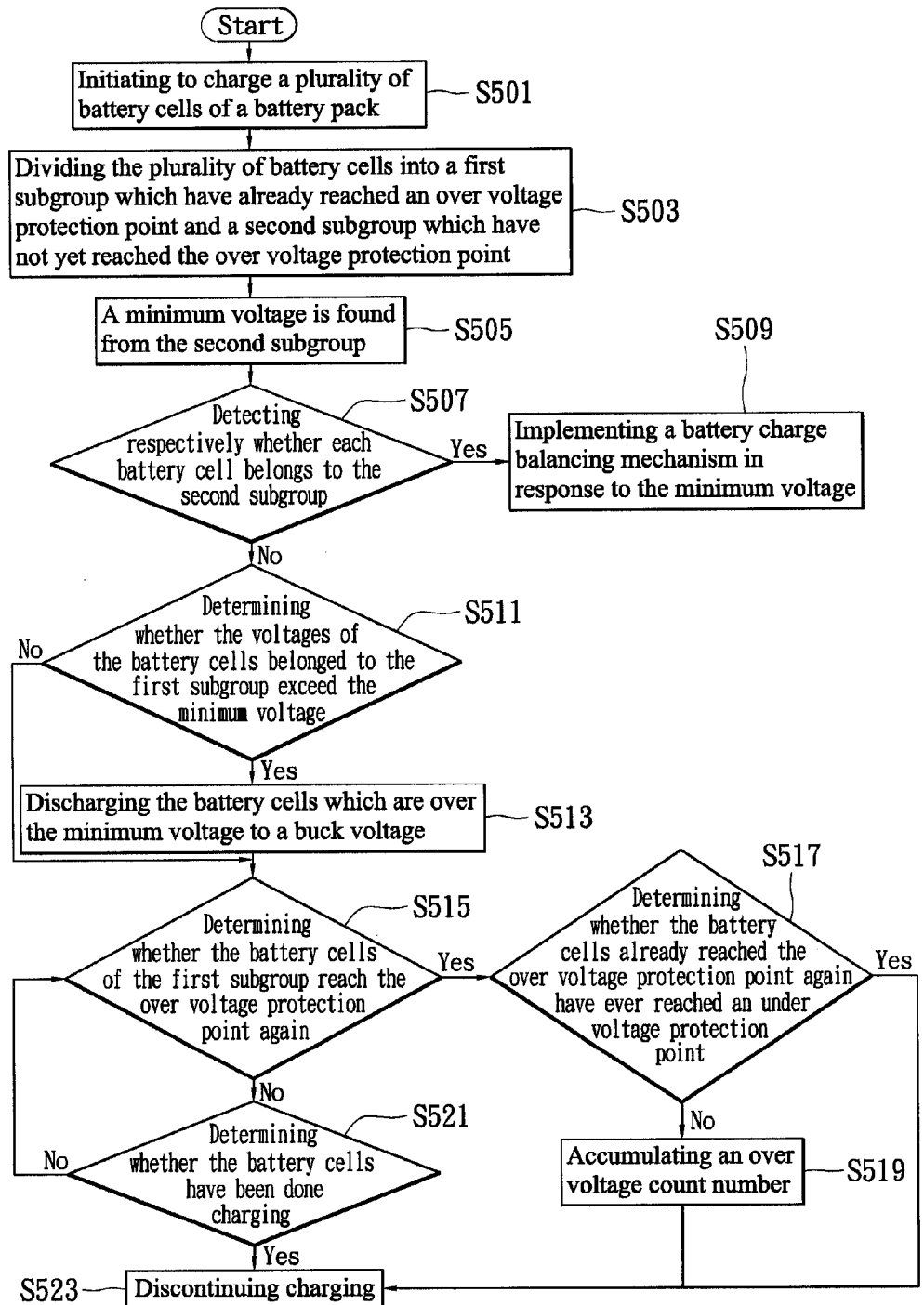
FIG. 3 illustrates a charging flowchart of a second embodiment of the battery balancing method in accordance with certain aspects of the present invention.
Figure 4:
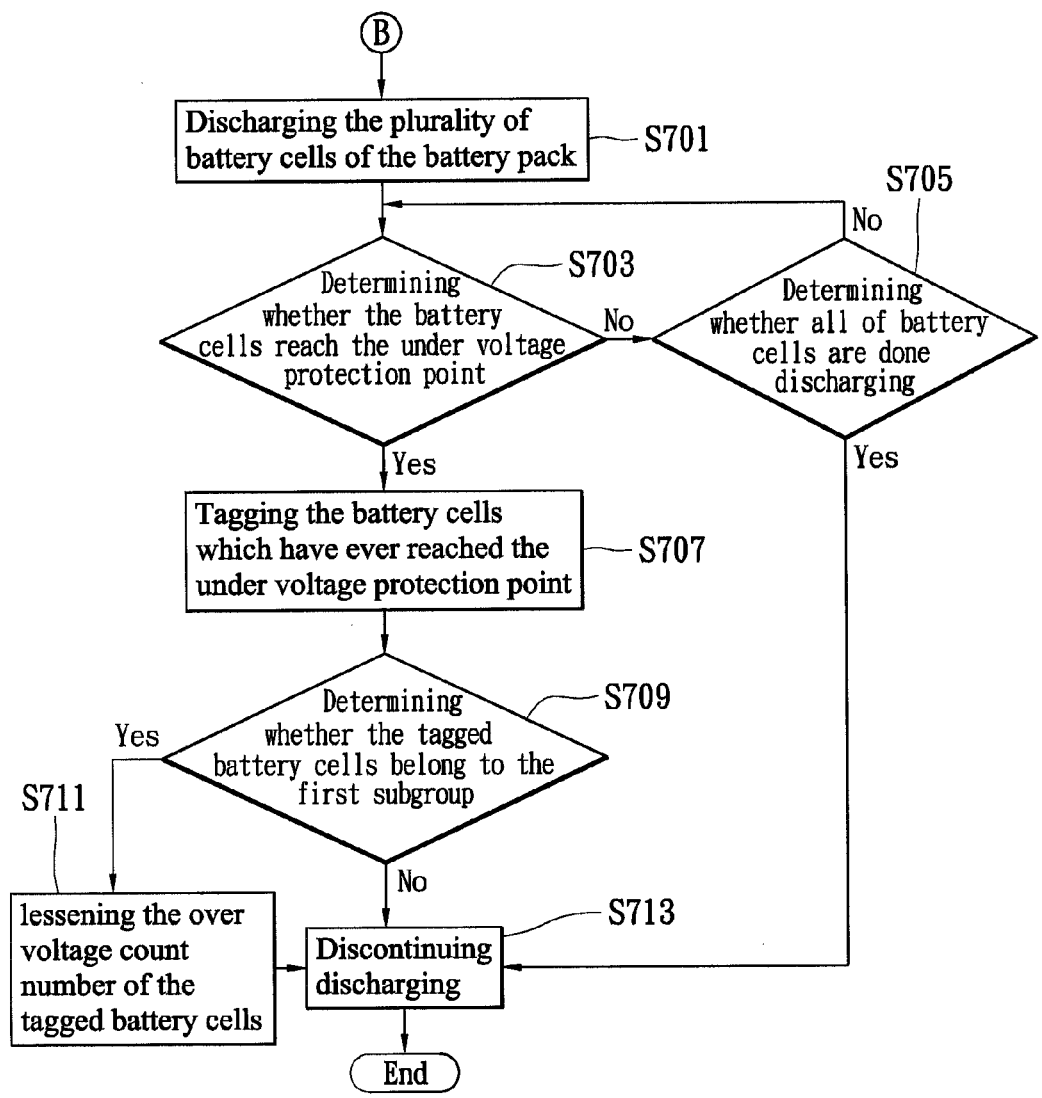
FIG. 4 illustrates a discharging flowchart of the second embodiment of the battery balancing method in accordance with certain aspects of the present invention.

Finally, referring to FIG. 3 and FIG. 4, in which a flowchart of a second embodiment of the battery balancing method according to the present invention is demonstrated. FIG. 3 is used to illustrate charging procedures of a battery pack in accordance with the voltage equalization and FIG. 4 is used to illustrate discharging procedures of the battery pack.

As shown in FIG. 3, first a plurality of battery cells included in the battery pack starts to charge one by one by the discharging and charging controller in step S501. each battery cell in the battery pack has an over voltage count number for recording how many time has each battery cell in the whole battery pack ever reached the over voltage protection point before other battery cells reach a predetermined operation voltage during the repeated discharging and charging operations. The over voltage count number may be implemented by a monitoring circuit or a micro-controller of a battery pack charge balancing circuit. In order to allow each batter cell in the battery pack has opportunities to reach the operation voltage in charging, not discontinue charging other battery cells which are not yet completed charged due to either one of the battery cells has already reached a charging threshold voltage, the battery cells of the battery pack are divided into a first subgroup with the over voltage count numbers greater than zero and into a second subgroup with the over voltage count numbers as zero in the preferred embodiment in step S503. In other words, the battery cells divided into the first subgroup are all reached the over voltage protection point and the battery cells divided into the second subgroup have not reached the over voltage protection point. For instance, there are 6 battery cells connected in series in the battery pack, named as A, B, C, D, E, and F respectively, wherein the battery cells A,B, and C belong to the first subgroup and the battery cells D, E, and F belong to the second subgroup.

After the classification, first identifying the minimum voltage from the battery cells in the second subgroup in step S505, e.g. the initial voltages of the battery cells D, E, and F are 2.7 V, 2.5 V, and 2.8 V respectively before charging operations, wherein the minimum voltage is the battery cell E of 2.5 V. The minimum voltage is a benchmark value for each battery cell to perform voltage equalization in charging. After identifying the minimum voltage, the micro-controller may control each battery cell to determine whether each batter cell belongs to the second subgroup in step S507. If the battery cells belong to the second subgroup, the battery cell may charge based on the minimum voltage as the benchmark voltages for the battery cells to perform voltage equalization in step S509.

For instance, as the micro-controller determines the battery cells D, E, and F are belonged to the second subgroup with respect to the minimum voltage of 2.5 V respectively, the battery cells A and F may perform passive type voltage equalization. It also means during the charging operations for the battery cells D, E, and F, additional electrical energy for the battery cells D, E, and F may be converted into heat energy for dissipation thru the resistance element, e.g. resistors, gradually, thereby reducing the voltage discrepancy between the battery cell D and D and preventing as both battery cells D and F all charged to the predetermined operating voltage, e.g. 3.3 V, the battery cell E is not yet reached the operating voltage.

Alternatively, if the micro-controller determine the other battery cells belonged to the first subgroup, e.g. the above-mentioned battery cells A, B, and C, the battery cells in the prior charging operations all have reached the over voltage protection point. Consequently, if the same voltage equalization mechanism is applied to charge the battery cells in the first and the second subgroup, it may conclude that before the voltages of the battery cells included in the second subgroup return to the operating voltage, the battery pack may stop charging because any one of the battery cells in the first subgroup have already reached the over voltage protection point, so that the battery cells in the second subgroup may have no opportunity to be charged to the operating voltage. As a result, in the embodiment, the technical proposal is to first reduce the benchmark voltages of the battery cells of the first subgroup, and then increase the voltage difference among the battery cells in the first and the second subgroups, thereby the battery cells in the first subgroup is required to spend more time to reach the effect of charging to the operation voltage, so that the battery cells in the second subgroup may have opportunities to be charged completely.

Therefore, as the micro-controller determine the battery cells are belonged to the first subgroup, it is necessary to further determine whether the voltages of the battery cells in the first subgroup before charging is higher than the minimum voltage identified from the second subgroup in step S511, i.e. 2.5 V; if the either one of the battery cells of the first subgroup has higher voltage than the minimum voltage, the voltage of the specific battery cell discharges to the buck voltage lower than the minimum voltage first and then continue to charge in step S513. For example, the battery cell A, B, and C have initial voltages of 3V, 2.4 V, and 2.8V, respectively, wherein the battery cells A and C have the voltages level higher than the minimum voltage, therefore, it is required to adjust lower the voltages of the battery cells A and C, respectively. The adjusting method is adapted to take a product of the over voltage count number of the battery cell and a voltage constant design by a designer in the preferred embodiment to perform adjustment, wherein the aforementioned voltage constant is a voltage unit of the buck voltage, e.g. 10 mV. For instance, the over voltage count numbers of the battery cells A and C are 3 and 2 respectively, the micro-controller may adjust the voltages of the battery cells A and C to 30 mV and 20 mV lower then the minimum voltage, respectively; the buck voltage of the battery cells A and C are 2.47 V and 2.48 V respectively after performing adjustment.

After the voltages of the battery cells in the first subgroup higher than the minimum voltage of the second subgroup have been adjusted to the buck voltage, each battery cell in the first subgroup also start to change in response to the benchmark voltages respectively. As per the aforementioned specifications, the benchmark voltage associated with each battery cell of the first subgroup after adjusting is not identical, e.g. the benchmark voltages of the battery cells from A to C are 2.47 V, 2.4 V, and 2.48 V, respectively. Accordingly, it's not the same as the battery cells of the second subgroup which take the minimum voltage as the general benchmark voltage.

Next, it is still required to monitor whether the battery cells of the first subgroup reached the over voltage protection point again during the charging operations in step S515. Even though the battery cells of the first subgroup adjusted the voltages thereof, they still reach the over voltage protection point, e.g. 3.7 V again before other battery cells reach to the operating voltage, it may represent the buck voltages of the battery cells are still too high, so that it is required to further determine whether the battery cells that reached the over voltage protection point again were tagged to represent that they have reached the under voltage protection point in the prior discharging operations in step S517. If the result is yes, it may represent that the battery cells are aged with faster charging and discharging speeds; otherwise, it may represent that the buck voltages of the battery cells were adjusted downward too much, so that the battery cells are not able to store charges normally. As per the situation mentioned above, though the battery cells reach the over voltage protection point again, the micro-controller does not accumulate the over voltage count number and merely terminate to charge the battery pack in step S523. However, if after the voltages associated with the battery cells of the first subgroup are adjusted, they have reached the over voltage protection point again during the charging operation in step S515, and they have no record showing that they have ever reached the under voltage protection point during the discharging operations in step S517, the micro-controller accumulate the over voltage count number of the battery cells by 1 in step S519 and then discontinue to charge each battery cell in step S523. For instance, the battery cell A reached the over voltage protection point after being decreasing the voltage and it have no record showing the battery cell A has ever reached the under voltage protection value, the over voltage count number accumulates from 3 to 4 by adding 1. As the battery pack performs charging operations next time, and the minimum voltage value is still 2.5 V, the buck voltage of the battery cell A is reduced to 2.46 V.

Additionally, after the battery cells D, E, and F of the second subgroup perform voltage equalization in response to the minimum voltage in step S509, if any one of the battery cells D, E, and F of the first subgroup reach the over voltage protection point, e.g. the battery cell D, before other battery cells complete charging, the over voltage count number of the battery cell D is accumulated, i.e. from 0 to 1, and terminate the charging operations for all of the battery cells of the battery pack. As such, as the battery pack prepares to perform charging operations next time, the battery cell D divided into the second subgroup initially, may be categorized into the first subgroup and performs charging operation from step S511, and so far and so forth.

Moreover, the discharging operations as shown in FIG. 4 are followed after the charging operations shown in FIG. 3, or after the discharging operations is completed, the charging operations in FIG. 3 are then in processing. At the start of charging operations, the discharging and charging controller charges the plurality of battery cells of the battery pack one by one in step S701; and it is necessary to determine whether any battery cells reach the under voltage protection point first in step S703, i.e. the minimum threshold voltage in discharging, e.g. 2 V. If there is no battery cell ever reached the under voltage protection point, the monitoring circuit further determines whether the battery cells in the battery pack are discharged completely in step S705. If the monitoring circuit already determines the battery cells are discharged completely, then stop to discharge in step S713 and wait till the battery pack performs the charging operations shown in FIG. 3; otherwise, if the battery cells in the battery pack are not yet discharged completely, the discharging and charging controller continues to charge and return to the step S703 to determine whether any one of battery cells reaches the under voltage protection point.

If there are specific battery cells which reached the under voltage protection point before the other battery cells are completed discharging during the discharging operations, it first tags the specific battery cells in step S707 and then determines whether the tagged battery cells belong to the first subgroup in step S709. The objective of the step is corresponding with the step S517 in FIG. 3 to determine whether the battery cells of the first subgroup have a charging benchmark voltage which is reduced too much at the start of charging operations. Therefore, if the battery cells which reached the under voltage protection are indeed belonged to the first group, after it lessens the over voltage count number in step S711, stop discharging the battery pack in step S713.

Referring to the example of FIG. 3, if the battery cell C first reaches the under voltage protection point, it represents in the previous charging operations the buck voltage of the battery cell C was reduced too much. Though it prevents the battery cell C reaches again the over voltage protection point, it reaches to the under voltage protection point easily. For example, at the start of discharging operations, the over voltage protection point of 3.7 V is reduced to the operation voltage of 3.3 V. During the same operating time, the left over voltage after discharging might change from 3.8 V to the under voltage protection point of 2 V rapidly. Thus, in order to equalize the over voltage and under voltage situations, the micro-controller first changes the over voltage count number from 2 to 1. As such, when the battery pack is charging next time, the reduction magnitude of the charging benchmark voltage of the battery cell C is reduced, and the voltage after charging may be controlled between the operation voltage and the over voltage protection point. After next discharging operations, the possibility for the voltage in accordance with the battery cell C to be too low may be prevented greatly.

Finally, according to the determination result in step S709, if the battery cells which reached the under voltage protection point are not belonged to the first subgroup, i.e. belonged to the second subgroup, stop to discharge the battery pack directly in step S713.

In the aspects of the aforementioned embodiments, a battery balancing mechanism for a battery pack is provided according to the technical characteristics of the present invention. Each battery cell of the battery pack is categorized and is adapted for different control voltage means with respect to different categorizations, so that it solves the unbalancing charge and discharge issues for battery cells, enhances the charge storage capability of the battery pack in practice, and enhances the overall service life.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention. Therefore, the over voltage count number of 0 is merely for illustration, but not limited thereto. The people skilled in the art are capable to adjust the value as necessary, or take other characteristics into considerations, as long as the voltage of the battery cells which are easily to be over the over voltage protection point may be divided from the other battery cells.

What is claimed is:

1. A battery balancing method for a battery pack, in which the battery pack has a plurality of rechargeable battery cells, comprising the steps of:
    (a) starting to charge the battery pack;
    (b) categorizing the battery cells into a first subgroup and a second subgroup, wherein each battery cell of the first subgroup has a corresponding over voltage count number greater than or equal to 1, and wherein each battery cell of the second subgroup has a corresponding over voltage count number equal to 0, the over voltage count numbers indicating how many times the corresponding battery cell has ever reached an over voltage protection point;
    (c) detecting a minimum voltage among the battery cells of the second subgroup;
    (d) when a voltage of a battery cell of the first subgroup is higher than the minimum voltage, decreasing the voltage of the battery cell to a buck voltage lower than the minimum voltage, wherein the buck voltage of the battery cell is based on the over voltage count number of the battery cell, a voltage constant of the battery cell, and the minimum voltage;
    (e) equalizing the voltages of the battery cells of the second subgroup based on the minimum voltage and equalizing the voltages of the battery cells of the first subgroup based on the buck voltages; and
    (f) discontinuing charging.

2. The battery balancing method according to claim 1, wherein the step (d) further comprises the steps of:
    determining respectively whether the battery cells of the battery pack belong to the first subgroup and whether the voltages of the battery cells in the first subgroup are higher than the minimum voltage;
    discharging the battery cells to the buck voltage when the voltages of the battery cells in the first subgroup are higher than the minimum voltage; and
    continuing charging after the voltages of the battery cells in the first subgroup reach the buck voltage.

3. The battery balancing method according to claim 2, wherein the step of determining whether the battery cells of the battery pack belong to the first subgroup, comprises the steps of:
    continuing charging when the battery cells do not belong to the first subgroup.

4. The battery balancing method according to claim 2, wherein the step of determining whether the voltages of the battery cells in the first subgroup are higher than the minimum voltage, comprises the steps of:
    continuing charging the battery cells when the voltages of the battery cells in the first subgroup are not exceeding the minimum voltage.

5. The battery balancing method according to claim 2, wherein each of the buck voltages of each of the battery cells equals to the minimum voltage minus the product of the voltage constant and the over voltage count number.

6. The battery balancing method according to claim 1, before the step (f), further comprising the steps of:
    increasing the over voltage count numbers of the battery cells when the voltages of the battery cells in the first subgroup reach the over voltage protection point again.

7. The battery balancing method according to claim 6, before the step of increasing the over voltage count numbers when the voltages of the battery cells of the first subgroup reach the over voltage protection point, comprising the steps of:
    detecting respectively whether the voltages of the battery cells of the first subgroup reach the over voltage protection point again; and
    determining respectively whether the battery cells whose voltages reach the over voltage protection point have a record for reaching an under voltage protection point so as to determine whether to increase the over voltage count numbers or not when the voltages of the battery cells reach the over voltage protection point again.

8. The battery balancing method according to claim 7, wherein the step of increasing the over voltage count numbers when the voltages of the battery cells of the first subgroup reach the over voltage protection point, comprises the steps of:
    decreasing the over voltage count numbers when the battery cells whose voltages reach the over voltage protection point again have a record for reaching the under voltage protection point; and
    increasing the over voltage count numbers when the battery cells whose voltages reach the over voltage protection point again do not have a record for reaching the under voltage protection point.

9. The battery balancing method according to claim 7, after the step of detecting whether the voltages of the battery cells of the first subgroup reach the over voltage protection point again, further comprising the steps of:
    continuing charging to the battery cells whose voltages are not detected reaching the over voltage protection point again.

10. The battery balancing method according to claim 9, before the step of discontinuing charging, further comprising the steps of:
    determining whether the battery cells of the battery pack are fully charged;
    executing the step of discontinuing charging when the battery cells are fully charged; and
    returning to the step of detecting whether the voltages of the battery cells of the first subgroup reach the over voltage protection point again when the battery cells are not yet fully charged.

11. The battery balancing method according to claim claim 10, after the step of categorizing the battery cells into the first subgroup and the second subgroup, further comprising the steps of:

detecting respectively whether the voltages of the battery cells of the second subgroup reach the over voltage protection point; and increasing the over voltage count numbers of the battery cells whose voltages reach the over voltage protection point and executing the step of discontinuing charging when the voltages of the battery cells of the second subgroup are detected reaching the over voltage protection point.

12. The battery balancing method according to claim 11, after the step of determining whether the voltages of the battery cells of the second subgroup reach the over voltage protection point, further comprising the steps of:

continuing charging the battery cells of the second subgroup after the voltages thereof decrease to the minimum voltage when the voltages of the battery cells of the second subgroup are not detected reaching the over voltage protection point.

13. The battery balancing method according to claim 8, after the step of discontinuing charging, further comprising the steps of:

starting to discharge the battery pack;

tagging the battery cells whose voltages reach the under voltage protection point;

decreasing the over voltage count numbers of the battery cells when the tagged battery cells belong to the first subgroup; and discontinuing discharging.

14. The battery balancing method according to claim 13, after the step of starting to discharge the battery pack, further comprising the steps of:

detecting respectively whether the battery cells in discharging reach the under voltage protection point; and continuing discharging until the whole battery pack is done discharging when the battery cells are detected to be not under the under voltage protection point.

15. The battery balancing method according to claim 14, after the step of tagging the battery cells whose voltages reach the under voltage protection point, further comprising the steps of:

determining whether the battery cells belong to the first subgroup or the second subgroup; and executing the step of discontinuing discharging when the tagged battery cells belong to the second subgroup.

16. A battery balancing method for a battery pack, in which the battery pack has a plurality of rechargeable battery cells, comprising the steps of:

categorizing the battery cells into a first subgroup and a second subgroup, wherein each battery cell of the first subgroup has a corresponding over voltage count number greater than or equal to 1, and wherein each battery cell of the second subgroup has a corresponding over voltage count number equal to 0, the over voltage count numbers indicating how many times the corresponding battery cell has ever reached an over voltage protection point, the battery cells of the first subgroup having faster charging speeds than those of the second subgroup;

detecting a minimum voltage among the battery cells of the second subgroup when charging the battery pack, equalizing the voltages of the battery cells of the second subgroup according to the minimum voltage, and when a voltage of a battery cell of the first subgroup is higher than the minimum voltage, decreasing the voltage of the battery cell to be lower than the minimum voltage respectively so as to equalize the voltages, wherein the decreased voltage of the battery cell is based on the over voltage count number of the battery cell, a voltage constant of the battery cell, and the minimum voltage;

increasing over voltage count numbers of the battery cells which already reached the over voltage protection point and discontinuing charging the battery pack when any one of battery cells of the battery pack reaches the over voltage protection point during the charging procedure; and continuing to charge the battery cells until the battery cells are all fully charged when the battery cells of the battery pack have not yet reached the over voltage protection point.

17. The battery balancing method according to claim 16, wherein the step of increasing over voltage count numbers of the battery cells which already reached the over voltage protection point, further comprises the steps of:

determining whether the battery cells have a record for reaching an under voltage protection point when the voltages of the battery cells of the first subgroup reach the over voltage protection point; and increasing the over voltage count numbers of the battery cells when the battery cells have no records.

18. The battery balancing method according to claim 17, wherein the step of determining whether the battery cells have a record for reaching an under voltage protection point, further comprises the steps of:

stopping an increase of the over voltage count numbers of the battery cells when the battery cells that belong to the first subgroup and already reached the over voltage protection point include a record of reaching the under voltage protection point.

19. The battery balancing method according to claim 18, after the step of discontinuing to charge the battery pack, further comprising the steps of:

detecting respectively whether the voltages of the battery cells of the battery pack reach the under voltage protection point during discharging the battery pack;

continuing discharging the battery cells when all of the battery cells have not reached the under voltage protection point; and discontinuing to discharge the battery pack when any one of the voltages of the battery cells reaches the under voltage protection point.

20. The battery balancing method according to claim 19, wherein the step of discontinuing to discharge the battery pack when any one of the voltages of the battery cells reaches the under voltage protection point, further comprises the steps of:

decreasing the over voltage count number of the battery cells when the voltages of the battery cells belonging to the first subgroup reach the under voltage protection point.

* * * * *